(12) United States Patent
Mehta

(10) Patent No.: US 7,529,107 B2
(45) Date of Patent: May 5, 2009

(54) POWER SUPPLY AND ELECTRONIC BALLAST WITH VOLTAGE CLAMPING CIRCUIT

(75) Inventor: Bhadresh Mehta, Bartlett, IL (US)

(73) Assignee: Osram Sylvania, Inc., Danvers, MA (US)

( * ) Notice: Subject to any disclaimer, the term of this patent is extended or adjusted under 35 U.S.C. 154(b) by 281 days.

(21) Appl. No.: 11/535,699

(22) Filed: Sep. 27, 2006

(65) Prior Publication Data
US 2008/0074909 A1 Mar. 27, 2008

(51) Int. Cl.
*H02H 7/125* (2006.01)
*H05B 37/02* (2006.01)

(52) U.S. Cl. .................. 363/53; 363/89; 323/266; 315/226

(58) Field of Classification Search .......... 363/50, 363/52, 53, 81, 89, 124, 125, 126, 127; 323/222, 323/223, 225, 259, 266, 299; 315/200 R, 315/207, 208, 209 R, 226, 287, 306
See application file for complete search history.

(56) References Cited

U.S. PATENT DOCUMENTS

| | | | | |
|---|---|---|---|---|
| 4,882,663 A * | 11/1989 | Nilssen | ..................... | 363/19 |
| 5,457,621 A * | 10/1995 | Munday et al. | .......... | 363/21.16 |
| 5,485,361 A * | 1/1996 | Sokal | ..................... | 363/21.17 |
| 5,598,326 A * | 1/1997 | Liu et al. | ..................... | 363/34 |
| 5,883,793 A * | 3/1999 | Farrington | ................ | 363/16 |
| 2007/0040516 A1 * | 2/2007 | Chen | ..................... | 315/291 |

* cited by examiner

*Primary Examiner*—Gary L Laxton
(74) *Attorney, Agent, or Firm*—Fitch, Even, Tabin & Flannery

(57) ABSTRACT

A circuit (20) for powering a load (50) includes a rectifier circuit (200), a voltage clamping circuit (300), and a DC-to-DC converter (400) such as a buck-boost converter. Voltage clamping circuit (300) is coupled between the rectifier circuit (200) and the DC-to-DC converter (400), and functions to prevent the input voltage ($V_{IN}$) of the DC-to-DC converter (400) from exceeding a predetermined acceptable level, so as to protect the DC-to-DC converter (400) from damage due to transients in a voltage ($V_{AC}$) provided by an AC line source (40). Preferably, voltage clamping circuit (300) is realized by an arrangement that includes a voltage divider circuit (320), a voltage sensing circuit (340), and an energy-limiting circuit (360), and is well-suited for use in power supplies and in electronic ballasts for powering gas discharge lamps.

19 Claims, 3 Drawing Sheets

POWER SUPPLY AND ELECTRONIC BALLAST WITH VOLTAGE CLAMPING CIRCUIT

FIELD OF THE INVENTION

The present invention relates to the general subjects of power supplies and ballast circuits for powering discharge lamps. More particularly, the present invention relates to a power supply and electronic ballast that includes a voltage clamping circuit.

BACKGROUND OF THE INVENTION

Many existing power supplies and electronic ballasts for gas discharge lamps include a DC-to-DC converter circuit, such as a boost converter, a buck converter, or a buck-boost converter, which provides power factor correction and other benefits. DC-to-DC converter circuits generally include at least one controllable power switching device, which is commonly realized by a field-effect transistor (FET).

FIG. 1 describes a common prior art arrangement 10 for a "front-end" portion of a power supply or electronic ballast. Arrangement 10 includes input connections 12,14 for receiving a source of alternating current (AC) voltage 40 (e.g., 480 volts rms at 60 hertz), an electromagnetic interference (EMI) filter 100, a rectifier circuit 200 (which, as commonly realized, provides an output voltage $V_{RECT}$ that is simply a full-wave rectified version of $V_{AC}$), and a DC-to-DC converter 400 which provides a substantially direct current (DC) output voltage $V_{RAIL}$ that is supplied to a "back-end" portion (not shown in FIG. 1) for powering a load 50 via output connections 26,28.

A significant problem that has been encountered with power supplies and ballasts configured according to FIG. 1 is failure of the FET (within DC-to-DC converter 400) due to momentary overvoltage conditions which occasionally occur in the voltage $V_{AC}$ between input connections 22,24. It should be understood that, in the absence of protective means, an overvoltage condition in $V_{AC}$ directly translates into an overvoltage condition in $V_{RECT}$.

These momentary overvoltage conditions are generally attributable to the electric utility (e.g., line surges), but have also been observed to occur when AC power is initially applied (i.e., the wall switch is turned on after having been turned off) to the power supply or ballast; it is believed that the latter type of occurrences are attributable to inductive energy stored in AC source 40 and/or in the stray inductance of the electrical wiring that exists between the AC source 40 and input connections 22,24.

The amount of energy in the transients that cause these overvoltage conditions has been found to be, at least in some instances, too large to be effectively suppressed by conventional means, such as a small capacitor, a zener diode, or a transient voltage suppressor (TVS) device. In the absence of effective suppression of these transients, the voltage across the FET exceeds the maximum voltage rating of the device and causes it to fail. The problem is especially acute for higher AC line voltages (e.g., 347 volts or 480 volts) because the peak amplitudes of the transients are correspondingly higher; also, because higher AC line voltages are usually connected to other heavy industrial-type loads, large transients tend to occur more frequently for higher AC line voltages than for lower AC line voltages (e.g., 120 volts or 277 volts).

Thus, a need exists for power supplies and electronic ballasts with a voltage clamping circuit that effectively protects the DC-to-DC converter from damage due to a temporary overvoltage condition at the inputs to the converter. Power supplies and electronic ballasts that include such a voltage clamping circuit would represent a considerable advance over the prior art.

DETAILED DESCRIPTION OF THE PREFERRED EMBODIMENTS

Figure 2:
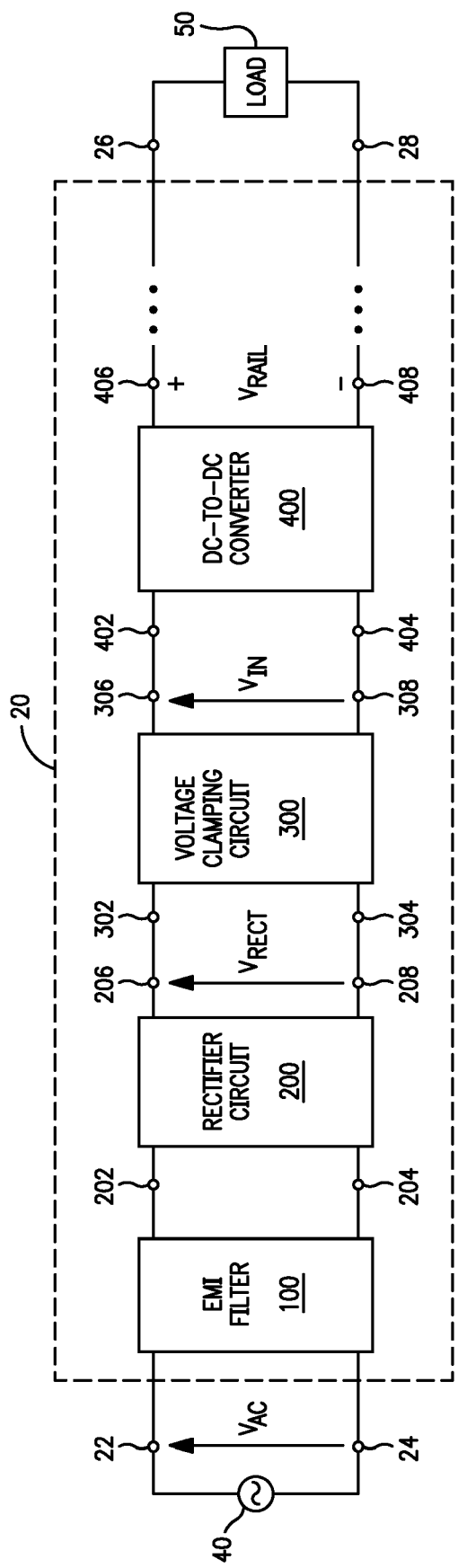
FIG. 2 is a block diagram of a front-end portion of a power supply or electronic ballast that includes a voltage clamping circuit, in accordance with the present invention.

FIG. 2 describes a circuit 20 for powering a load 50. Circuit 20, which may constitute the front-end portion of a power supply or an electronic ballast for gas discharge lamps, includes first and second AC input connections 22,24, first and second load output connections 26,28, a rectifier circuit 200, a voltage clamping circuit 300, and a DC-to-DC converter 400. As will be described in further detail herein, voltage clamping circuit 300 operates to protect DC-to-DC converter 400 from damage due to overvoltage.

First and second AC input connections 22,24 are intended to receive a conventional source 40 of alternating current (AC) voltage, $V_{AC}$ (e.g., 480 volts (rms) at 60 hertz). First and second load output connections 26,28 are intended to be coupled to load 50; when circuit 20 is employed within an electronic ballast, load 50 includes one or more gas discharge lamps.

Rectifier circuit 200 has a pair of input connections 202, 204 and a pair of output connections 206,208. Input connections 202,204 are adapted to receive (either directly or via an EMI filter 100) the voltage, $V_{AC}$, supplied by AC voltage source 40. During operation, rectifier circuit 200 provides a rectified output voltage, $V_{RECT}$, between output connections 206,208; when rectifier circuit 200 is realized by a full-wave rectifier circuit (which is commonly the case), $V_{RECT}$ has a peak (maximum) value that is substantially equal to the peak value of $V_{AC}$. Thus, any overshoot or large amplitude voltage spike that is present in $V_{AC}$ will generally also appear in $V_{RECT}$.

DC-to-DC converter 400 has a pair of input terminals 402, 404 and a pair of output terminals 406,408. Input terminals 402,404 are adapted to receive an input voltage, $V_{IN}$. During operation, DC-to-DC converter 400 provides a substantially direct current (DC) rail voltage, $V_{RAIL}$, between output terminals 406,408.

Voltage clamping circuit 300 is coupled between output connections 206,208 of rectifier circuit 200 and input terminals 402,404 of DC-to-DC converter 400. During operation, voltage clamping circuit 300 prevents the input voltage, $V_{IN}$, provided to the input terminals of DC-to-DC converter 400 from exceeding a predetermined acceptable level (e.g., 800 volts). Thus, voltage clamping circuit 300 ensures that the components within DC-to-DC converter 400 (especially power switching devices, such as transistors) are not destroyed as a result of line transients or other phenomena associated with AC voltage source 40. More particularly, voltage clamping circuit 300 is intended to protect DC-to-DC converter 400 from the momentary but substantial overvoltage conditions (e.g., the peak value of $V_{AC}$ attempting to exceed 900 volts or so) that have sometimes been observed to occur in $V_{AC}$; such overvoltage conditions have been observed to occur due to line transients attributable to the electric utility (e.g., line surges) and also when AC power is applied (i.e., the wall switch is turned on after having been turned off, or is repetitively turned on and off) when $V_{AC}$ is at or near its peak instantaneous value. In the absence of voltage claming circuit 300 (or some other effective clamping means), such overvoltage conditions in $V_{AC}$ appear in the input voltage $V_{IN}$ (which typically is simply a full-wave rectified, but unfiltered, version of $V_{AC}$) provided to input terminals 402,404 of DC-to-DC converter 400.

In a preferred embodiment of the present invention, voltage clamping circuit 300 performs two functions. First, voltage clamping circuit 300 monitors the rectified output voltage, $V_{RECT}$, provided across output connections 206,208 of rectifier circuit 200. Second, in response to $V_{RECT}$ attempting to exceed a predetermined peak value (e.g., 800 volts), voltage clamping circuit 300 actively limits the input voltage, $V_{IN}$, provided to input terminals 402,404 of DC-to-DC converter 400 so that $V_{IN}$ is limited to a predetermined acceptable level (e.g., 800 volts).

Figure 3:
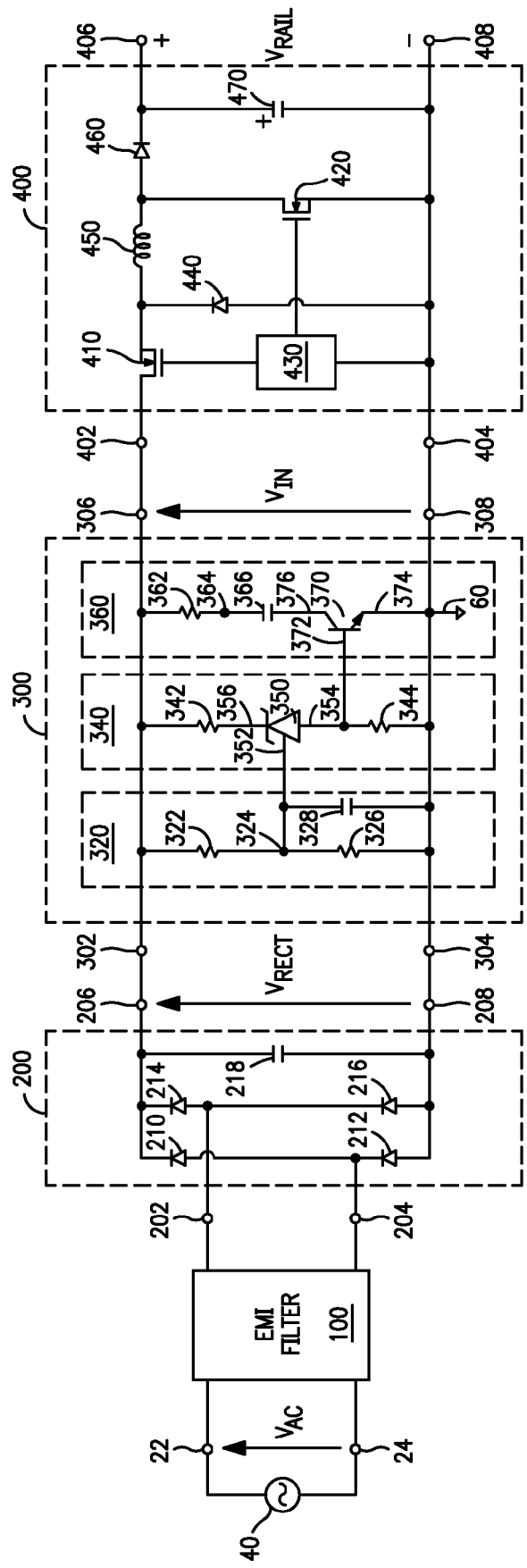
FIG. 3 is a more detailed electrical diagram of a front-end portion of a power supply or electronic ballast that includes a voltage clamping circuit, in accordance with a preferred embodiment of the present invention.

Turning now to FIG. 3, in a preferred embodiment of circuit 20, voltage clamping circuit includes first and second inputs 302,304, first and second outputs 306,308, a voltage divider circuit 320, a voltage sensing circuit 340, and an energy-limiting circuit 360. First and second inputs 302,304 are coupled to output connections 206,208 of rectifier circuit 200. First and second outputs 306,308 are coupled to input terminals 402,404 of DC-to-DC converter 400. As described in FIG. 3, first input 302 is coupled to first output 306, second input 304 is coupled to second output 308, and second input 304 and second output 308 are each coupled to circuit ground 60. Voltage divider circuit 320 is coupled between first and second inputs 302,304; during operation, voltage divider circuit 320 provides a voltage signal that is proportional to the rectified output voltage, $V_{RECT}$, of rectifier circuit 200. Voltage sensing circuit 340 is coupled to voltage divider circuit 320 as well as to first and second inputs 302,304; during operation, voltage sensing circuit 340 activates (i.e., turns on) when the voltage signal (provided by voltage divider circuit 320) exceeds a predetermined threshold. Energy-limiting circuit 360 is coupled to voltage sensing circuit 340 as well as to first and second outputs 306,308; during operation, in response to activation of voltage sensing circuit 340, energy-limiting circuit 360 turns on and limits the input voltage, $V_{IN}$, provided to input terminals 402,404 of DC-to-DC converter 400 to the predetermined acceptable level.

As described in FIG. 3, rectifier circuit 200 is realized as a full-wave diode bridge 210,212,214,216 and a high frequency filtering capacitor 218, and DC-to-DC converter 400 is realized as a buck-boost converter 410,420,430,440,450, 460,470. It should be appreciated, however, that voltage clamping circuit 300 may be effectively employed in conjunction with other types of rectifier circuits (such as a valley-fill circuit) and other types of DC-to-DC converters (such as buck converters or boost converters) that are commonly used within power supplies and electronic ballasts, and that are well-known to those skilled in the relevant arts.

Referring again to FIG. 3, specific preferred circuitry for realizing voltage clamping circuit 300 is now described as follows.

Voltage divider circuit 320 preferably includes a first resistor 322, a second resistor 326, and a first capacitor 328. First resistor 322 is coupled between first input 302 and a first node 324. Second resistor 326 is coupled between first node 324 and circuit ground 60. First capacitor 328 is likewise coupled between first node 324 and circuit ground 60. As previously mentioned, voltage divider circuit 320 monitors the voltage, $V_{RECT}$, between output connections 206,208 of rectifier circuit 200. More particularly, the voltage across second resistor 326 (which is on the order of several volts or so) is a scaled-down version of $V_{RECT}$ (which is on the order of hundreds of volts—e.g., about 679 volts when $V_{AC}$ is 480 volts rms); stated another way, the voltage signal across second resistor 326 is proportional to $V_{RECT}$. Capacitor 328 serves to attenuate any high frequency noise that might otherwise appear across second resistor 326.

Voltage sensing circuit 340 preferably includes a shunt regulator 350, a third resistor 342, and a fourth resistor 344. Shunt regulator 350 has a control terminal 352, a first conduction terminal 354, and a second conduction terminal 356, and is preferably realized by a suitable integrated circuit (IC), such a TL431 precision shunt regulator IC. Control terminal 352 is coupled to first node 324 within voltage divider circuit 320. Third resistor 342 is coupled between first input 302 and second conduction terminal 356 of shunt regulator 350. Fourth resistor 344 is coupled between first conduction terminal 354 of shunt regulator 350 and circuit ground 60. During operation, shunt regulator 350 is activated (i.e., turns on) when the voltage signal (across resistor 326) from voltage divider circuit 320 attempts to exceed the predetermined threshold (which occurs when $V_{RECT}$ attempts to exceed the predetermined peak value). When shunt regulator 350 is activated, current flows through resistors 342,344; the resulting voltage across resistor 344 caused energy-limiting circuit 360 to turn on (which, as described below, effectively limits $V_{IN}$ to protect DC-to-DC converter 400 from damage due to overvoltage).

Figure 1:
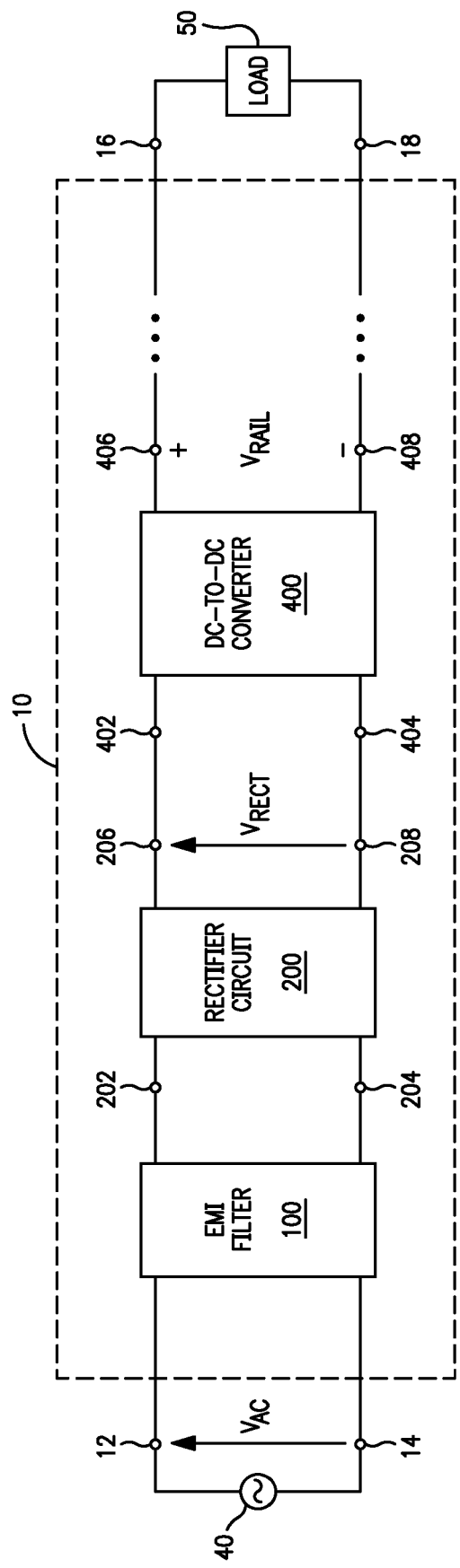
FIG. 1 is a block diagram of a common front-end portion of a power supply or electronic ballast, in accordance with the prior art.

Energy-limiting circuit 360 preferably includes an electronic switch 370, a fifth resistor 362, and a second capacitor 366. Electronic switch 370 may be realized by any of a number of suitable power switching devices, such as a bipolar junction transistor (BJT) or a field-effect transistor (FET). As depicted in FIG. 1, electronic switch 370 is preferably realized as a NPN type BJT; alternatively, electronic switch 370 may be realized by a N-channel FET. Electronic switch 370 has a base terminal 372, an emitter terminal 374, and a collector terminal 376. Base terminal 372 is coupled to first conduction terminal 354 of shunt regulator 350 within voltage sensing circuit 340. Fifth resistor 362 is coupled between first output 306 and a second node 364. Second capacitor 366 is coupled between second node 364 and collector terminal 376 of electronic switch 370. During operation, when voltage sensing circuit 340 is activated (i.e., when shunt regulator 350 is activated), electronic switch 370 turns on. With electronic switch 370 turned on, the series combination of resistor 362 and capacitor 366 is effectively connected across outputs 306,308 (of voltage clamping circuit 360) and input terminals 402,404 (of DC-to-DC converter 400). Subsequently, the energy of the transient that caused $V_{RECT}$ to exceed the predetermined peak value is absorbed/suppresses by the resulting current that flows through resistor 362 and capacitor 366; a portion of that energy is dissipated in resistor 362, while another portion is converted into stored energy in capacitor 366. In this way, energy-limiting circuit 360 operates (in conjunction with voltage divider circuit 320 and voltage sensing circuit 340) to limit $V_{IN}$ to the predetermined acceptable level, thereby protecting DC-to-DC converter 400 from damage due to overvoltage.

When electronic switch 370 is realized by a NPN type BJT, it is recommended that energy-limiting circuit 360 further include a diode connected in parallel with electronic switch 370 (i.e., with the anode of the diode coupled to emitter terminal 374, and the cathode of the diode coupled to the collector terminal 376) so as to provide a discharge path, when BJT 370 is turned off, for any remaining stored energy in capacitor 366. Alternatively, if electronic switch 370 is realized by a N-channel FET, an additional diode is not required because the FET's body diode (internal to the FET) will provide the desired discharge path.

It should be understood that voltage clamping circuit 300 is essentially inactive (i.e., shunt regulator 350 and electronic switch 370 are non-conductive) during normal operating conditions when no overvoltage condition occurs in $V_{AC}$. Thus, voltage clamping circuit 300 introduces very little additional steady-state power dissipation within the power supply or ballast in which it is incorporated.

Preferred components and/or component values for implementing voltage clamping circuit 300 are listed as follows:
  Voltage divider circuit 320:
    Resistor 322: Two 180 kilohm resistors connected in series
    Resistor 326: 1.1 kilohm
    Capacitor 328: 0.1 microfarad (50 volt)
  Voltage sensing circuit 340:
    Shunt regulator 350: Part No. TL431 (precision shunt regulator I.C.)
    Resistor 342: Two 100 kilohm resistors connected in series
    Resistor 344: 1 kilohm
  Energy-limiting circuit 360:
    Electronic switch 370: MJE18002D (NPN type bipolar junction transistor)
    Resistor 362: 30 ohm, 3 watt
    Capacitor 366: Two 1.5 microfarad (630 volt) capacitors connected in series Although the present invention has been described with reference to certain preferred embodiments, numerous modifications and variations can be made by those skilled in the art without departing from the novel spirit and scope of this invention.

What is claimed is:

1. A circuit for powering a load, the circuit comprising:
  first and second AC input connections for receiving a conventional source of alternating current (AC) voltage;
  first and second load output connections for coupling to a load;
  a rectifier circuit having a pair of input connections and a pair of output connections, wherein the input connections are adapted to receive the source of AC voltage, and the rectifier circuit is operable to provide a rectified output voltage between the output connections;
  a DC-to-DC converter having a pair of input terminals and a pair of output terminals, wherein the input terminals are adapted to receive an input voltage, and the DC-to-DC converter is operable to provide a substantially direct current (DC) rail voltage between the output terminals; and
  a voltage clamping circuit coupled between the output connections of the rectifier circuit and the input terminals of the DC-to-DC converter, wherein the voltage clamping circuit is operable to prevent the input voltage provided to the input terminals of the DC-to-DC converter from exceeding a predetermined acceptable level, wherein said voltage clamping circuit comprises:
    first and second inputs coupled to the output connections of the rectifier circuit;
    first and second outputs coupled to the input terminals of the DC-to-DC converter, wherein the first input is coupled to the first output, the second input is coupled to the second output, and the second input and the second output are coupled to circuit ground;
    a voltage sensing circuit operatively coupled between the first and second inputs, wherein the voltage sensing circuit activates in response to a voltage signal exceeding a predetermined threshold, wherein the voltage signal is representative of the rectified output voltage; and
    an energy-limiting circuit coupled to the voltage sensing circuit and coupled between the first and second outputs, wherein the energy-limiting circuit is operable, in response to activation of the voltage sensing circuit, to turn on and limit the input voltage provided to the input terminals of the DC-to-DC converter to the predetermined acceptable level.

2. The circuit of claim 1, wherein the voltage clamping circuit is further operable to:
  (i) monitor the rectified output voltage provided across the output connections of the rectifier circuit; and
  (ii) in response to the rectified output voltage attempting to exceed a predetermined peak value, to actively limit the input voltage provided to the input terminals of the DC-to-DC converter to the predetermined acceptable level.

3. The circuit of claim 1, wherein the voltage clamping circuit further comprises
  a voltage divider circuit coupled between the first and second inputs and operable to provide the voltage signal to the voltage sensing circuit, wherein said voltage signal is proportional to the rectified output voltage.

4. The circuit of claim 1, wherein the voltage divider circuit comprises:
  a first resistor coupled between the first input and a first node;
  a second resistor coupled between the first node and circuit ground; and
  a capacitor coupled between the first node and circuit ground.

5. The circuit of claim 1, wherein the voltage sensing circuit comprises:
  a shunt regulator having a control terminal, a first conduction terminal, and a second conduction terminal, wherein the control terminal is coupled to the voltage divider circuit;
  a first resistor coupled between the first input and the second conduction terminal of the shunt regulator; and
  a second resistor coupled between the first conduction terminal of the shunt regulator and circuit ground.

6. The circuit of claim 1, wherein the energy-limiting circuit comprises:
  an electronic switch having a base terminal, an emitter terminal, and a collector terminal, wherein the base terminal is coupled to the voltage sensing circuit;
  a resistor coupled between the first output and a second node; and
  a capacitor coupled between the second node and the collector terminal of the electronic switch.

7. The circuit of claim 6, wherein the electronic switch is a NPN-type bipolar junction transistor.

8. The circuit of claim 1, wherein the DC-to-DC converter is a buck-boost converter.

9. The circuit of claim 1, wherein the DC-to-DC converter is one of: (i) a buck converter; and (ii) a boost converter.

10. The circuit of claim 1, wherein the load includes at least one gas discharge lamp.

11. A ballast for powering at least one gas discharge lamp, the ballast comprising:
first and second AC input connections for receiving a conventional source of alternating current (AC) voltage;
first and second load output connections adapted for coupling to at least one gas discharge lamp;
a rectifier circuit having a pair of input connections and a pair of output connections, wherein the input connections are adapted to receive the source of AC voltage, and the rectifier circuit is operable to provide a rectified output voltage between the output connections;
a DC-to-DC converter having a pair of input terminals and a pair of output terminals, wherein the input terminals are adapted to receive an input voltage, and the DC-to-DC converter is operable to provide a substantially direct current (DC) rail voltage between the output terminals; and
a voltage clamping circuit coupled between the output connections of the rectifier circuit and the input terminals of the DC-to-DC converter, wherein the voltage clamping circuit comprises:
first and second inputs coupled to the output connections of the rectifier circuit;
first and second outputs coupled to the input terminals of the DC-to-DC converter, wherein the first input is coupled to the first output, the second input is coupled to the second output, and the second input and the second output are coupled to circuit ground;
a voltage divider circuit coupled between the first and second inputs;
a voltage sensing circuit coupled to the voltage divider circuit and coupled between the first and second inputs; and
an energy-limiting circuit coupled to the voltage sensing circuit and coupled between the first and second outputs, wherein the energy-limiting circuit is operable, in response to activation of the voltage sensing circuit, to limit the input voltage provided to the input terminals of the DC-to-DC converter to a predetermined acceptable level.

12. The ballast of claim 11, wherein the DC-to-DC converter is one of: (i) a buck-boost converter; (ii) a buck converter; and (iii) a boost converter.

13. The ballast of claim 11, wherein the voltage divider circuit comprises:
a first resistor coupled between the first input and a first node;
a second resistor coupled between the first node and circuit ground; and
a first capacitor coupled between the first node and circuit ground.

14. The ballast of claim 13, wherein the voltage sensing circuit comprises:
a shunt regulator having a control terminal, a first conduction terminal, and a second conduction terminal, wherein the control terminal is coupled to the first node within the voltage divider circuit;
a third resistor coupled between the first input and the second conduction terminal of the shunt regulator; and
a fourth resistor coupled between the first conduction terminal of the shunt regulator and circuit ground.

15. The ballast of claim 14, wherein the energy-limiting circuit comprises:
an electronic switch having a base terminal, an emitter terminal, and a collector terminal, wherein the base terminal is coupled to the first conduction terminal of the shunt regulator within the voltage sensing circuit;
a fifth resistor coupled between the first output and a second node; and
a second capacitor coupled between the second node and the collector terminal of the electronic switch.

16. The ballast of claim 15, wherein the electronic switch is a NPN-type bipolar junction transistor.

17. The ballast of claim 15, wherein the DC-to-DC converter is one of: (i) a buck-boost converter; (ii) a buck converter; and (iii) a boost converter.

18. A ballast for powering at least one gas discharge lamp, the ballast comprising:
first and second AC input connections for receiving a source of alternating current (AC) voltage;
first and second load output connections adapted for coupling to the at least one gas discharge lamp;
a rectifier circuit having a pair of input connections and a pair of output connections;
a buck-boost converter having a pair of input terminals and a pair of output terminals; and
a voltage clamping circuit coupled between the output connections of the rectifier circuit and the input terminals of the buck-boost converter, wherein the voltage clamping circuit comprises:
first and second inputs coupled to the output connections of the rectifier circuit;
first and second outputs coupled to the input terminals of the buck-boost converter, wherein the first input is coupled to the first output, the second input is coupled to the second output, and the second input and the second output are each coupled to circuit ground;
a voltage divider circuit, comprising:
a first resistor coupled between the first input and a first node;
a second resistor coupled between the first node and circuit ground; and
a first capacitor coupled between the first node and circuit ground;
a voltage sensing circuit, comprising:
a shunt regulator having a control terminal, a first conduction terminal, and a second conduction terminal, wherein the control terminal is coupled to the first node within the voltage divider circuit;
a third resistor coupled between the first input and the second conduction terminal of the shunt regulator; and
a fourth resistor coupled between the first conduction terminal of the shunt regulator and circuit ground;
an energy-limiting circuit, comprising:
an electronic switch having a base terminal, an emitter terminal, and a collector terminal, wherein the base terminal is coupled to the first conduction terminal of the shunt regulator within the voltage sensing circuit;
a fifth resistor coupled between the first output and a second node; and
a second capacitor coupled between the second node and the collector terminal of the electronic switch.

19. The ballast of claim 18, wherein the electronic switch is a NPN-type bipolar junction transistor.

* * * * *